United States Patent [19]
Matsumoto

[11] Patent Number: 5,953,219
[45] Date of Patent: Sep. 14, 1999

[54] CONTROL CIRCUIT POWER SUPPLY CIRCUIT AND POWER SUPPLY CIRCUIT INCLUDING SAME

[75] Inventor: Tadahiko Matsumoto, Yokohama, Japan

[73] Assignee: Murata Manufacturing Co., Ltd., Japan

[21] Appl. No.: 09/184,191

[22] Filed: Nov. 2, 1998

[30] Foreign Application Priority Data

Nov. 6, 1997 [JP] Japan .................................. 9-320379

[51] Int. Cl.[6] .................................................. H02M 3/335
[52] U.S. Cl. ............................ 363/21; 363/49; 363/56
[58] Field of Search ................................ 363/20, 21, 40, 363/41, 49, 56, 131

[56] References Cited

U.S. PATENT DOCUMENTS

| | | | |
|---|---|---|---|
| 3,781,638 | 12/1973 | Anderson et al. | 363/56 |
| 4,156,273 | 5/1979 | Sato | 363/56 |
| 4,236,187 | 11/1980 | Mochizuki et al. | 361/36 |
| 4,751,629 | 6/1988 | Shimizu et al. | 363/37 |
| 4,754,386 | 6/1988 | De Weerd | 363/21 |
| 5,293,308 | 3/1994 | Boys et al. | 363/37 |
| 5,768,118 | 6/1998 | Faulk et al. | 363/72 |
| 5,812,383 | 9/1998 | Majid et al. | 363/21 |
| 5,831,839 | 11/1998 | Pansier | 363/21 |
| 5,838,556 | 11/1998 | Yokoyama | 363/56 |

*Primary Examiner*—Adolf Deneke Berhane
*Attorney, Agent, or Firm*—Ostrolenk, Faber, Gerb & Soffen, LLP

[57] ABSTRACT

A control power supply circuit adapted for the reduction of conduction loss at a low load and for providing overcurrent protection operation. The control power supply circuit operates to supply power having a control voltage to a control circuit. In addition to a main power supply circuit in which an output voltage from an auxiliary coil flows through diodes, a choke coil, and a power source capacitor to be rectified and smoothed, and the power is supplied for the control circuit from the main power supply circuit, and wherein a start-up circuit in which an output voltage from an input power source flows through a resistor and transistors, and wherein power is supplied to the control circuit at starting-up and during overvoltage protection operation, there is provided in the control power supply circuit an auxiliary power supply circuit in which an output voltage from the auxiliary coil is rectified and smoothed by a rectifying circuit and a capacitor and stabilized at the control voltage by a transistor acting as a series regulator, and the power is supplied to the control circuit at a low load and during overcurrent protection operation.

4 Claims, 5 Drawing Sheets

FIG. 9 PRIOR ART

CONTROL CIRCUIT POWER SUPPLY CIRCUIT AND POWER SUPPLY CIRCUIT INCLUDING SAME

BACKGROUND OF THE INVENTION

1. Field of the Invention

The present invention relates to a control circuit power supply circuit to be incorporated into a power source circuit in which a voltage outputted from a transformer is rectified and smoothed by the switch on-off operation of a switch element and operative to supply power to a control circuit for controlling the switch on-off operation of the switch element.

The present invention also relates to a power supply circuit comprising the control power supply circuit.

2. Description of the Related Art

Figure 9:
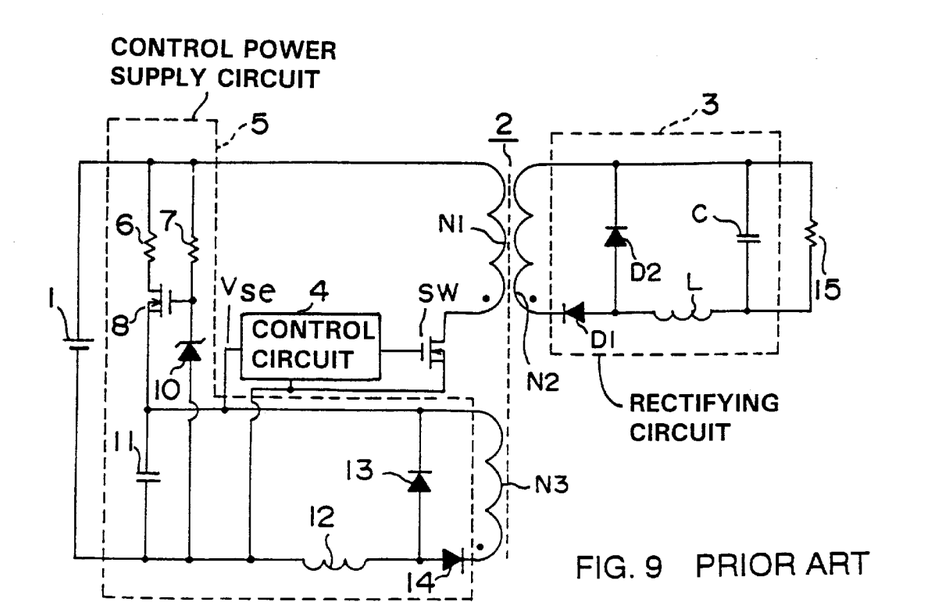
FIG. 9 is a circuit diagram showing a power source circuit in which a conventional control circuit power supply circuit is incorporated.

FIG. 9 shows a prior art control circuit power supply circuit in the state where it is incorporated in a resonance reset forward converter as a power source circuit. The power source circuit shown in FIG. 9 comprises a direct current input power source 1, a transformer 2, a choke input rectifying circuit 3, a switch element SW, a control circuit 4, and a control power supply circuit 5. The choke input rectifying circuit 3 comprises diodes D1, D2, a choke coil L, and a smoothing capacitor C. The control circuit 4 has a circuit configuration in which a pulse signal for controlling the on-off state of the switch element SW (MOS-FET in the circuit shown in FIG. 9) is applied on the gate of the switch element SW to control the switching of the switch element SW. The control circuit power supply circuit 5 comprises resistors 6,7, a transistor element 8 (MOS-FET in the circuit shown in FIG. 9), a Zener diode 10, a power source capacitor 11, a choke coil 12, and diodes 13, 14.

As shown in FIG. 9, the positive electrode side of the input power source 1 is connected to one side of a primary coil N1 of the transformer 2. The other side of the primary coil N1 is connected to the drain of a transistor element as the switch element SW. The source of the switch element SW is connected to the negative electrode side of the input power source 1. Further, the gate of the switch element SW is connected to the control circuit 4.

One side of a secondary coil N2 of the transformer 2 is connected to the cathode of the diode D1. The anode of the diode D1 is connected to the anode of the diode D2. The cathode of the diode D2 is connected to the other side of the secondary coil N2.

Further, a node between the diodes D1, D2 is connected to one side of the choke coil L. The other side of the choke coil L is connected to one side of the smoothing capacitor C. The other end of the smoothing capacitor C is connected to a node between the secondary coil N2 and the diode D2. A load 15 is connected in parallel with the smoothing capacitor C.

The transformer 2 is provided with an auxiliary coil N3. One side of the auxiliary coil N3 is connected to the cathode of the diode 14. The anode of the diode 14 is connected to the anode of the diode 13. The cathode of the diode 13 is connected to the other side of the auxiliary coil N3. One side of the choke coil 12 is connected to a node between the anode of the diode 13 and the anode of the diode 14.

The other side of the choke coil 12 is connected to the negative electrode side of the input power source 1, the anode of the Zener diode 10, and one side of the power source capacitor 11, respectively. The other side of the power source capacitor 11 is connected to the source of the transistor 8, the cathode of the diode 13, and the control circuit 4, respectively.

The cathode of the Zener diode 10 is connected to the gate of the transistor element 8 and one side of the resistor 7, respectively. The other side of the resistor 7 is connected to the positive electrode side of the input power source 1. The drain of the transistor element 8 is connected to one side of the resistor 6. The other side of the resistor 6 is connected to the positive electrode side of the input power source 1.

The power source circuit shown in FIG. 9 is configured as described above. As well known, when the switch element SW switches on under the switching control of the control circuit 4, the power of the input power source 1 energizes the electric path from the positive electrode side of the input power source 1 through the primary coil N1 and the switch element SW to the negative electrode side of the input power source 1, to provide power for the transformer 2. The power outputted from the secondary coil N2, in dependence on the power supplied to the transformer 2 in the above manner, is rectified and smoothed by the choke input rectifying circuit 3 to be supplied to the load 15.

Figure 5:
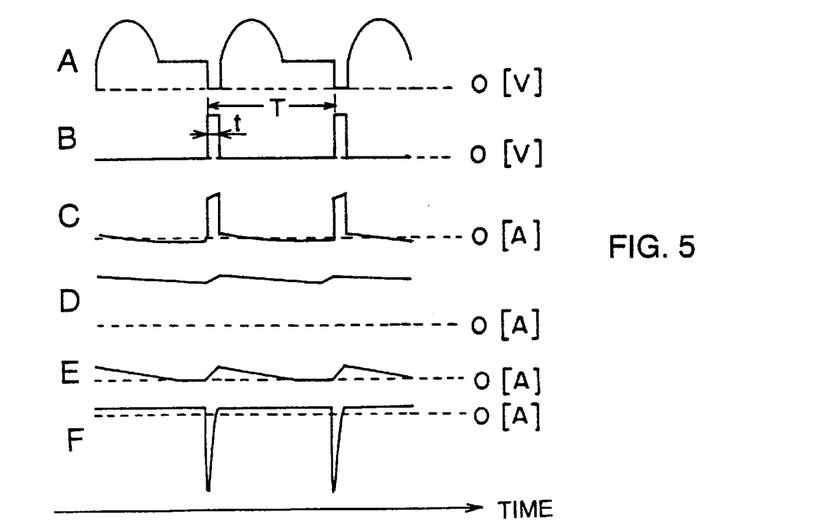
FIGS. 5A to 5F are waveform diagrams showing the voltage/current waveforms of voltage/current flowing through the respective elements of the circuit shown in FIG. 4.

The control circuit 4 so controls the pulse width t of a pulse signal as shown by waveform B in FIG. 5 to be applied on the switch element SW, that the output voltage Vout from the power source circuit to the load 15 equals a predetermined voltage Vst. More particularly, the pulse signal rises every predetermined period T, when the output voltage Vout becomes lower than the setting voltage Vst, the shortage of the output voltage Vout on a setting voltage Vst basis is compensated by lengthening the pulse width t of the pulse signal (that is, the ratio (t/T (duty)) of the pulse width t to the period T is increased) to increase the electric energy to be supplied from the input power source 1 to the transformer 2 to increase the output voltage from the transformer 2. On the contrary, when the output voltage Vout becomes higher than the setting voltage Vst, the excess of the output voltage Vout over the setting voltage Vst is compensated for the stabilization control of the output voltage Vout by shortening the pulse width t of the pulse signal (the duty is reduced) to decrease the voltage output from the transformer 2.

The control circuit power supply circuit 5 is so configured as to supply power having the predetermined control voltage Vse to the control circuit 4 whereby the control circuit 4 can carry out the switching control of the switch element SW with high stability. A main power supply circuit is provided therein in which a power outputted from the auxiliary coil N3 is rectified and smoothed by the power source capacitor 11, the choke coil 12, and the diodes 13, 14 in the control power supply circuit 5, and supplied to the control circuit 4, and a start-up circuit is provided, in which a power having the control voltage Vse, provided through the resistor 6 and the transistor 8 in the control circuit power supply circuit 5, by using power from the input power source 1, is supplied to the control circuit 4.

The auxiliary coil N3, in the normal condition, outputs a power having a stable voltage by the switching operation of the switch element SW. Accordingly, a power having the control voltage Vse can be stably supplied from the main power to the control circuit 4 in the normal condition, by setting the circuit constants of the respective elements of the control power supply circuit 5 so that the setting control voltage Vse can be stably supplied to the control circuit 4 in the normal condition.

As the Zener diode 10, one which can apply a voltage nearly equal to the control voltage to the gate of the transistor element 8 is employed, and thereby, when a voltage nearly equal to the control voltage Vse is supplied from the main power supply circuit to the control circuit 4 as described above, the transistor 8 is controlled by the Zener diode 10 to be in its conduction-off state so that the supply of power from the start-up circuit to the control circuit 4 is prevented.

At starting up, or if an abnormality causes an excess voltage to be applied to the load 15 and the smoothing capacitor C (when the overvoltage protection is operated), the switch element SW is brought into its down state, which prevents the auxiliary coil N3 from outputting power. In this case, the transistor element 8 gets into the conducting state by the control of the Zener diode 10, and a power of the input power source 1, passing the resistor 6 and the transistor element 8 sequentially, is supplied to the control circuit 4.

In this case, the transistor element 8 acts as a series regulator. On the gate of the transistor element 8, a predetermined control terminal voltage for supplying a power at the control voltage Vse from the transistor element 8 to the control circuit 4 is stably applied by the Zener diode as described above, so that the power at the control voltage Vse can be stably supplied to the control circuit 4.

At a low load, that is, when the load 15 has a high resistance to reduce significantly the current to be supplied to the load 15, or when a current flowing in the choke input rectifying circuit 3 becomes excessively large in event of an abnormality (when the overcurrent protection is operated), a pulse signal having a very low duty is applied from the control circuit 4 to the switch element SW. This causes the situation that a voltage to be supplied from the main power supply circuit to the control circuit 4 becomes much lower than the setting control voltage Vse.

In this case, by the circuit configuration in FIG. 9, the transistor element 8 is controlled by the Zener diode 10 to be brought into its conducting state, and thereby, a power at the control voltage Vse can be supplied from the input power source 1, passing the transistor element 8, to the control circuit 4.

However, as the conducting time period of the transistor element 8 as the series regulator is longer and the difference between the voltages of the transistor element 8 on the incoming, outgoing sides is larger, so the conduction loss in the transistor element 8 is greater. ordinarily, the continuation time period of the low load or overcurrent state is long, and the voltage of the input power source 1 is much higher than the control voltage Vse to be supplied to the control circuit 4, and the difference between the voltages of the transistor element 8 on the incoming, outgoing sides is large. Thus, there is a problem that the conduction loss in the transistor element 8 is great and the circuit efficiency is low at the low load or during overcurrent protection operation.

Further, heat stress in dependence on the conduction loss is applied to the transistor element 8. Accordingly, at a light load and overcurrent protection, a great heat stress is imposed on the transistor element 8. For this reason, as the transistor element 8, one having a high heat durability is employed, allowing for the generation of a large heat stress at a low load and overcurrent protection operation. However, devices having such a high heat durability are difficult to be miniaturized, and are bulky. There arises a problem that the package of the power source circuit is large in size.

SUMMARY OF THE INVENTION

The present invention can solve the aforementioned problems associated with the conventional control circuit power supply circuit, and provides a control power supply circuit which can prevent the deterioration of the circuit efficacy at a low load and overcurrent protection operation, and can inhibit circuit elements from suffering heat stress. The present invention also provides a power supply circuit having the control circuit power supply circuit.

The control circuit power supply circuit is adapted to be incorporated into a power supply circuit in which power of an input power source is intermittently supplied to a transformer by an on-off switching operation of a switch element and an output of the transformer is rectified and smoothed to output an output voltage, and operative to supply power having a predetermined control voltage to a control circuit for controlling the on-off switching operation of the switch element to stabilize the output voltage of the power source circuit. The control circuit power supply circuit comprises a start-up circuit, a main power supply circuit, an auxiliary power circuit and a power supply change-over circuit. The start-up circuit includes a series regulator and supplies power stabilized at the control voltage by the series regulator by using power of the input power source. The main power supply circuit excludes a series regulator and rectifies and smoothes power outputted from an auxiliary coil provided at the transformer and then supplies it to the control circuit. The auxiliary power supply circuit includes a series regulator and rectifies and smoothes the power from the auxiliary coil and stabilizes it at the control voltage by the series regulator. The stabilized power is then supplied to the control circuit. The power supply change-over circuit either makes the main electric power supply circuit supply power to the control circuit when the voltage of the power supplied from the control circuit is stable at the control voltage, makes the auxiliary power supply circuit supply power to the control circuit when the voltage of the power supplied to the main power supply circuit to the control circuit becomes lower than a predetermined voltage below the control voltage, or makes the start-up circuit supply power to the control circuit when the power output from the auxiliary coil is prevented.

The power supply circuit comprises: a transformer having a primary coil, a secondary coil and an auxiliary coil; a rectifying circuit, connected to the secondary coil of the transformer, for outputting an output voltage; a switching element, connected to the primary coil of the transformer, for intermittently supplying power of an input power to the primary coil by a control power supply circuit of the switching element; a control circuit, connected to the switching element, for controlling the on-off operation of the switching element so as to stabilize the output voltage of the rectifying circuit; and the aforementioned control power supply circuit, connected to the control circuit.

The power change-over circuit may include a series connection of a first transistor element and a second transistor element, whereby the first transistor element also acts as the series regulator in the start-up circuit, and the second transistor element also acts as the series regulator in the auxiliary power supply circuit; when the voltage of the power supplied from the main power supply circuit to the control circuit is stable at the control voltage, both of the first and second transistor elements in the electric power change-over circuit are in a conduction-off state, so that the power is supplied directly from the main power supply circuit to the control circuit, without flowing through the first and second transistor elements; and when the power supplied from the main electric power supply circuit to the control circuit becomes lower than a predetermined voltage below the control voltage, the second transistor element gets into a conducting state while the first transistor element is kept in the conduction-off state, so that power having the control voltage after flowing through the second transistor element is supplied from the auxiliary electric power supply circuit to the control circuit, and when the power output from the auxiliary coil is prevented, both of the first and second transistor elements get into the conducting state, so that power having the control voltage after flowing through the first transistor element and the second transistor element from the input power source, sequentially, is supplied from the start-up circuit to the control circuit.

With the above-described configuration in accordance with the present invention, the power supply change-over circuit makes the main power supply circuit supply power to the control circuit when the voltage of the power supplied from the control circuit is stable at the control voltage, makes the auxiliary power supply circuit supply power to the control circuit when the voltage of the power supplied from the main power supply circuit to the control circuit becomes lower than a predetermined voltage below the control voltage, and makes the start-up circuit supply a power to the control circuit when the power output from the auxiliary coil is prevented.

Since the main power supply circuit from the control circuit excludes a series regulator, the conduction loss, incurred when power is supplied from the main power supply circuit to the control circuit, can be inhibited to a great extent. Though the start-up circuit includes a series regulator, the conduction loss in the start-up circuit, caused when power is supplied from the start-up circuit to the control circuit, is very low, since the time period required at start-up and so forth is very short.

Though the auxiliary power supply circuit includes a series regulator, the conduction loss in the auxiliary power supply circuit can be remarkably inhibited as compared with that in the start-up circuit, since the difference between a voltage outputted from the auxiliary coil and the control voltage is significantly smaller than that between the voltage of the input power source and the control voltage.

As described above, the conduction loss can be remarkably inhibited in any case that power is supplied to the control circuit through the main power supply circuit, the auxiliary power supply circuit, or the star-up circuit. In addition, heat stress on the elements configuring the circuits can be inhibited. This makes it unnecessary to use large devices with a high thermal durability, which enables the miniaturization of the circuit. Thus, the above-described problem can be solved.

For the purpose of illustrating the invention, there is shown in the drawings several forms which are presently preferred, it being understood, however, that the invention is not limited to the precise arrangements and instrumentalities shown.

Other features and advantages of the present invention will become apparent from the following description of the invention which refers to the accompanying drawings.

DETAILED DESCRIPTION OF EMBODIMENTS OF THE INVENTION

Hereinafter, the preferred embodiments of the present invention are explained in detail with reference to the drawings.

Figure 1:
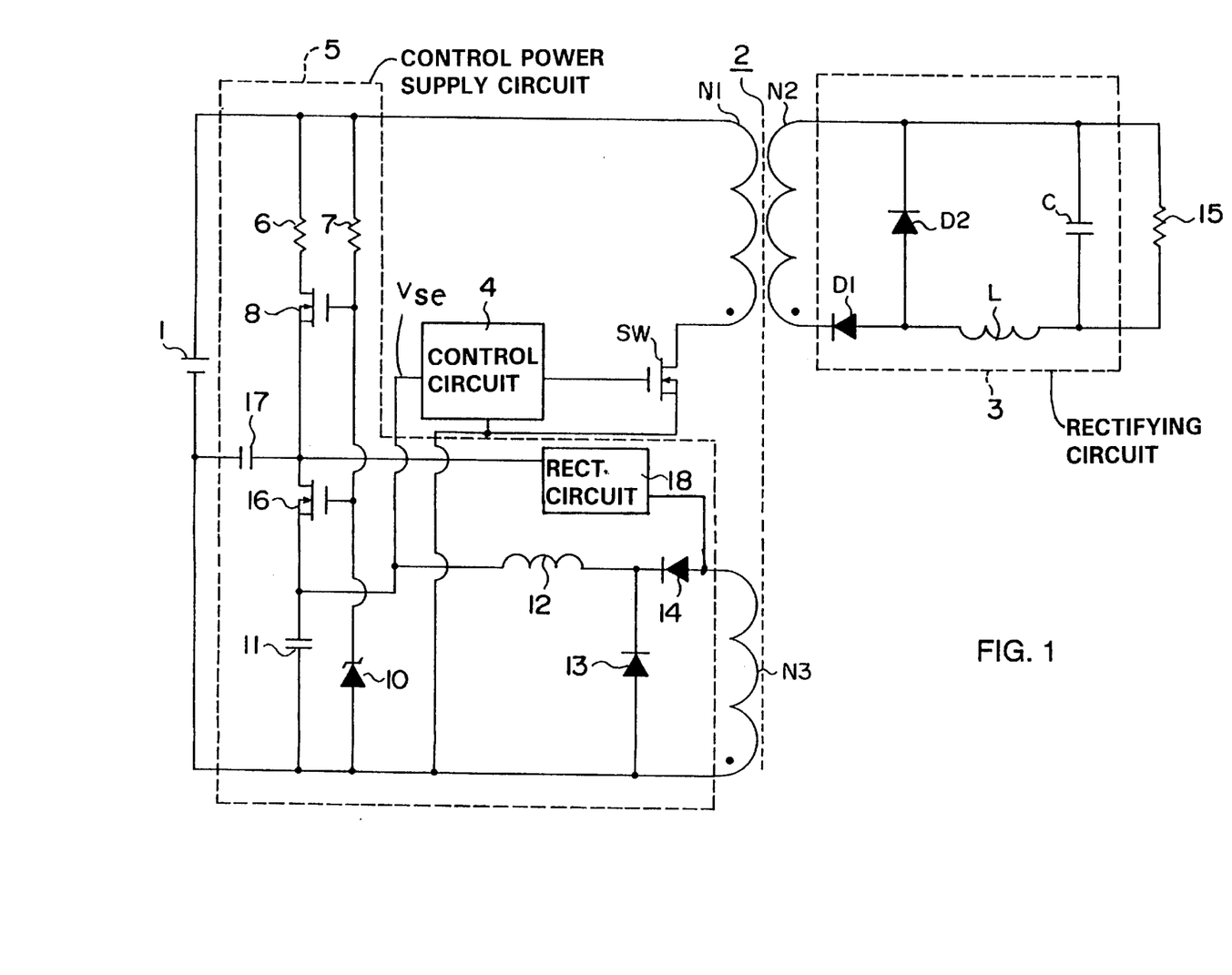
FIG. 1 is a circuit diagram showing a power source circuit in which the above-described embodiment of a control circuit power supply circuit according to the present invention is incorporated.

FIG. 1 shows an embodiment of a control circuit power supply circuit according to the present invention which is incorporated in a resonance reset forward converter as a power supply circuit. One of the essential features according to this embodiment is that an auxiliary power supply circuit is additionally provided in the circuit configuration shown in FIG. 9 whereby power is supplied from the auxiliary power supply circuit to the control circuit at a low load and during overcurrent protection operation. As for this embodiment, the description of the elements in common with those of the circuit configuration shown in FIG. 9 will be omitted.

As shown in FIG. 1, a transistor element 16 is interposed between a transistor element 8 and a power source capacitor 11 with the source of the transistor element 16 positioned on the capacitor 11 side. A node between the power source capacitor 11 and the transistor element 16 is connected to the control circuit 4. The gate of the transistor element 16 is connected to the cathode of a Zener diode 10.

Further, one side of a capacitor 17 is connected to a node between the transistor element 8 and the transistor element 16. The other side of the capacitor 17 is connected to the negative electrode side of the input power source 1. Still further, a rectifying circuit 18 for rectifying a voltage outputted from the auxiliary coil N3 is connected to the node between the transistor element 16 and the capacitor 17.

An auxiliary power supply circuit is provided, in which an output voltage from the auxiliary coil N3 is rectified, smoothed by the capacitor 17, the transistor element 16, and the rectifying circuit 18, and power having the control voltage Vse is supplied to the control circuit 4. A power supply change-over circuit is provided, in which the supply of power to the control circuit 4 is so changed over so as to be carried out through only one of the main power supply circuit, the auxiliary power supply circuit, and the start-up circuit by the resistor 7, the transistor element 8, the Zener diode 10, and the transistor element 16.

The power supply change-over circuit is configured to make the main power supply circuit supply power to the control circuit 4 when power having a substantially stable control voltage Vse can be supplied from the main power supply circuit to the control circuit 4 (in the normal condition), make the auxiliary power supply circuit supply power to the control circuit 4 when the output voltage from the main electric power supply circuit becomes lower than a predetermined voltage below the control voltage Vse (that is, at a low load and overcurrent protection operation), or make the start-up circuit supply power to the control circuit 4 when the output of power from the auxiliary coil N3 is prevented, and at overvoltage protection operation).

More concretely, the circuit constants of the resistors 6, 7, the transistor element 8, the Zener diode 10, and the transistor element 16 are so set that the transistor elements 8, 16 are controlled by the Zener diode 10 to be in the conduction off-state in the normal condition, so that power is supplied from the main power supply circuit to the control circuit 4; the transistor element 16 gets into a conducting state while the transistor element 8 is kept in the conduction-off state when the power outputted from the main power supply circuit markedly decreases to be lower than a predetermined voltage below the control voltage Vse, that is, at a low load and during overcurrent protection operation, so that power is supplied from the auxiliary circuit to the control circuit 4; and both of the transistor elements 8, 16 are brought into a conducting state when the output of power from the auxiliary coil N3 is prevented, that is, at start-up and during overvoltage protection operation, so that power is supplied from the start-up circuit to the control circuit 4.

Figure 2A:
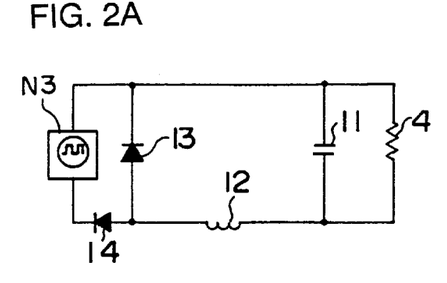
FIGS. 2A to 2D are circuit diagrams showing rectifying circuits to be incorporated into the auxiliary circuit shown in FIG. 1, respectively, in addition to a circuit diagram of the main power supply circuit part which is extracted from the circuit shown in FIG. 1.

The rectifying circuit 18 may have any circuit configuration, if it satisfies the following condition. That is, when the switch element SW is controlled in the duty range where a voltage outputted from the main power supply circuit comprising the choke coil 12 and the diodes 13, 14, as shown in FIG. 2A, becomes lower than the control voltage Vse, in other words, when the switch element SW is controlled at a duty smaller than coordinate x of the full line curve A in FIG. 3 which shows a relationship between the voltage outputted from the main power supply circuit and the duty ratio, the voltage outputted from the rectifying circuit 18, smoothed by the capacitor 17, is higher than the voltage outputted from the main power supply circuit.

Figure 2B:
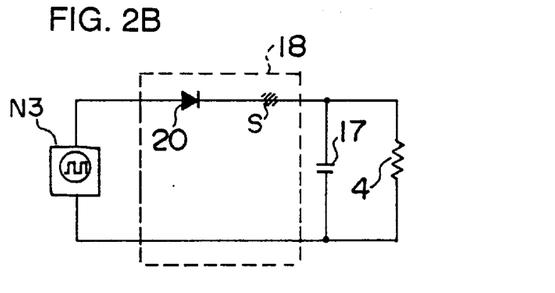
Figure 2C:
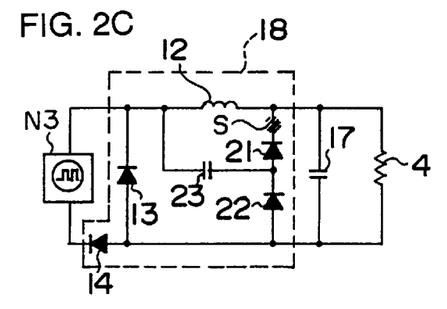
Figure 2D:
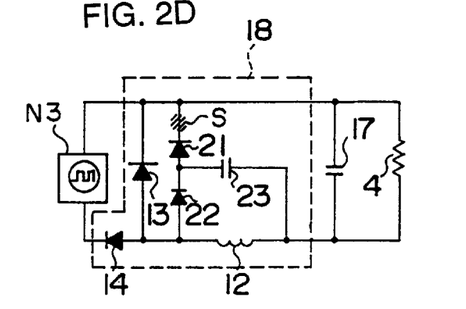
Figure 3:
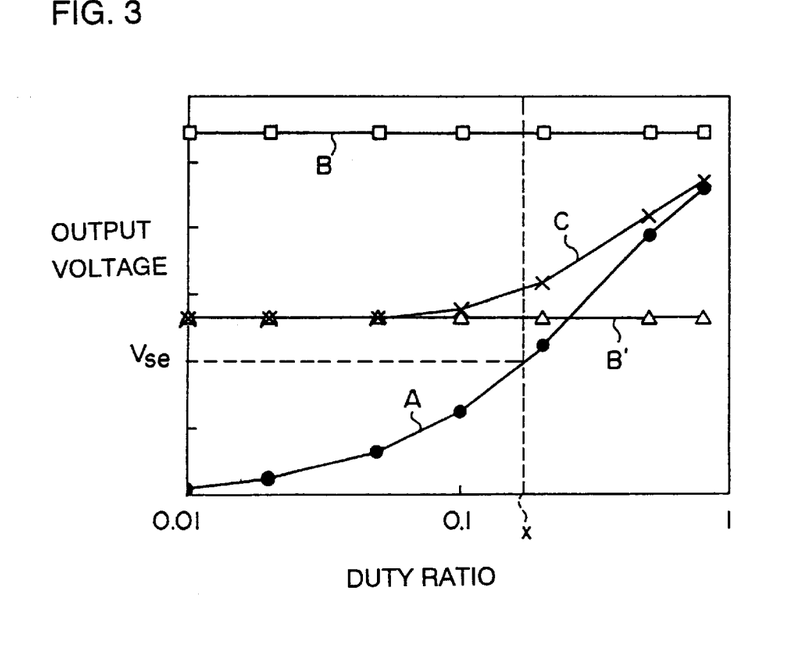
FIG. 3 graphically shows relationships between output voltages outputted from the respective circuits shown in FIGS. 2 and the duties of signals controlling the switch element SW, respectively.

Other examples of the rectifying circuit 18 are shown in FIGS. 2B, 2C, and 2D. The data on the relationships between the output voltages rectified and smoothed by the rectifying circuits and the capacitors 17 and the duties, empirically obtained by the inventor, is graphically shown in FIG. 3. The curve A in FIG. 3 represents the data on the main power supply circuit shown in FIG. 2A. The curve B in FIG. 3 represents the data on the circuit shown in FIG. 2B. The curve B' in FIG. 3 represents the data on the case where a voltage equal to half of the voltage outputted from the auxiliary coil N3 is inputted into the circuit shown in FIG. 2B. The curve C in FIG. 3 represents the data on the circuit shown in FIG. 2C. The relationship between the output voltage from the circuit shown in FIG. 2D and the duty is similar to that concerning the circuit shown in FIG. 2C. Thus, the curve C shown in FIG. 3 also represents the data on the circuit shown in FIG. 2D. Needless to say, all the data were obtained in the same conditions excepting the circuit configurations of the rectifying circuit 18.

The duty at which the output voltage of the main power supply circuit is lower than the control voltage Vse is in the range of up to the duty x, based on the curve A shown in FIG. 3. The graphical data in FIG. 3 shows that the voltage outputted from any of the circuits in FIGS. 2B, 2C, and 2D is higher than the output voltage of the main power supply circuit. Thus, it is understood that the rectifying circuits 18 shown in FIGS. 2B, 2C, and 2D satisfy the above-mentioned condition, and may be built in the auxiliary power supply circuit.

With a series regulator provided at positions S in the circuits shown in FIGS. 2B, 2C, and 2D, a power having a predetermined voltage can be outputted. In this embodiment, the transistor element 16, which also acts as the series regulator, is built into the circuit shown in FIG. 1 in such a manner that the transistor element 16 is located at the position S in each above-described circuit.

Figure 4:
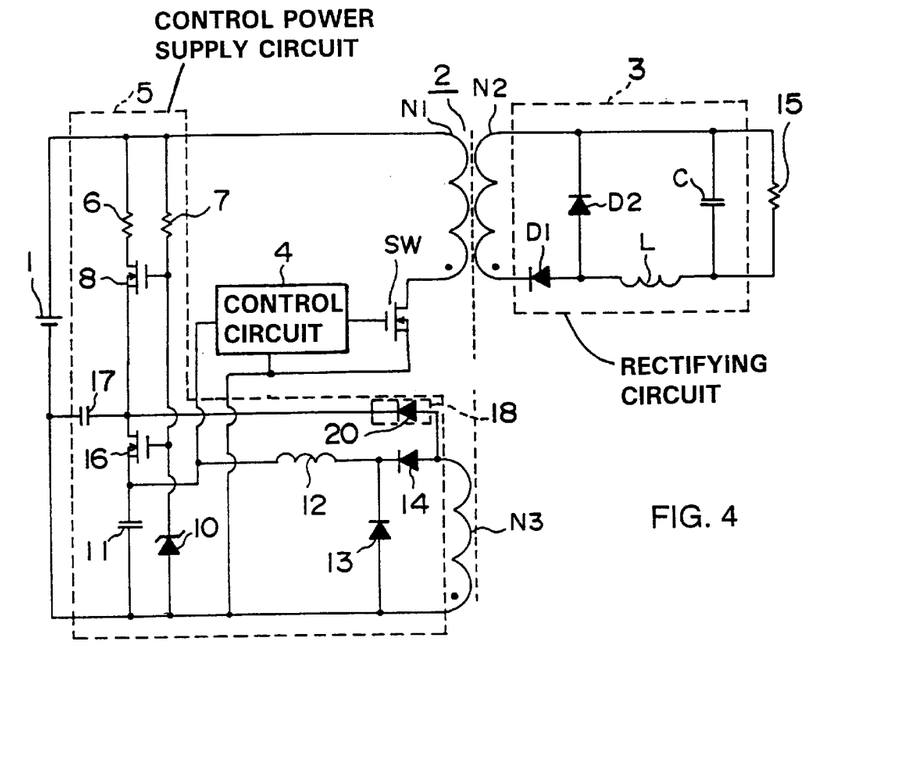
FIGS. 4 is a circuit diagram showing the circuit in FIG. 1, in which the rectifying circuit shown in FIG. 2(b) is incorporated.
Figure 6:
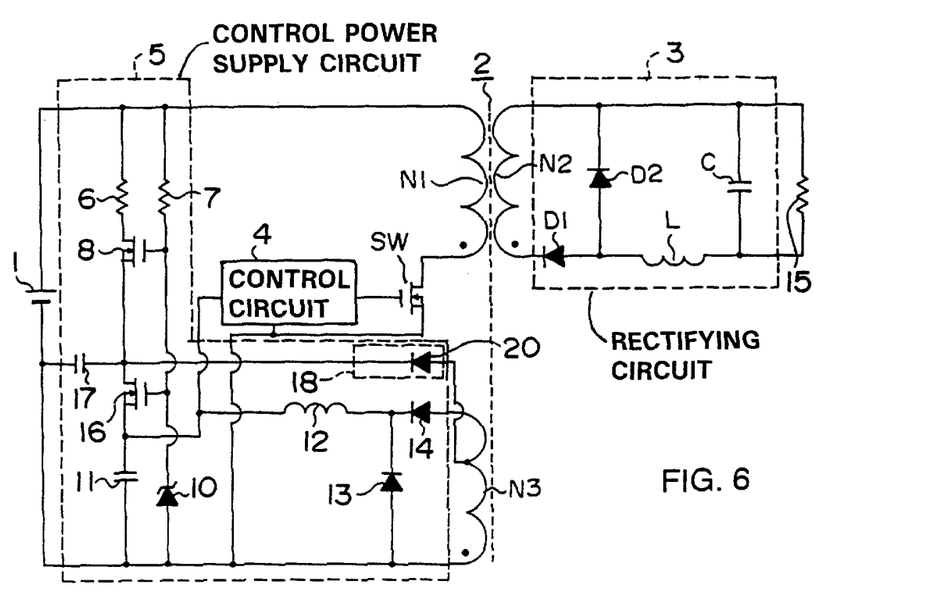
FIG. 6 is a circuit diagram showing a circuit shown in FIG. 1 in which the rectifying circuit shown in FIG. 2B is incorporated.
Figure 7:
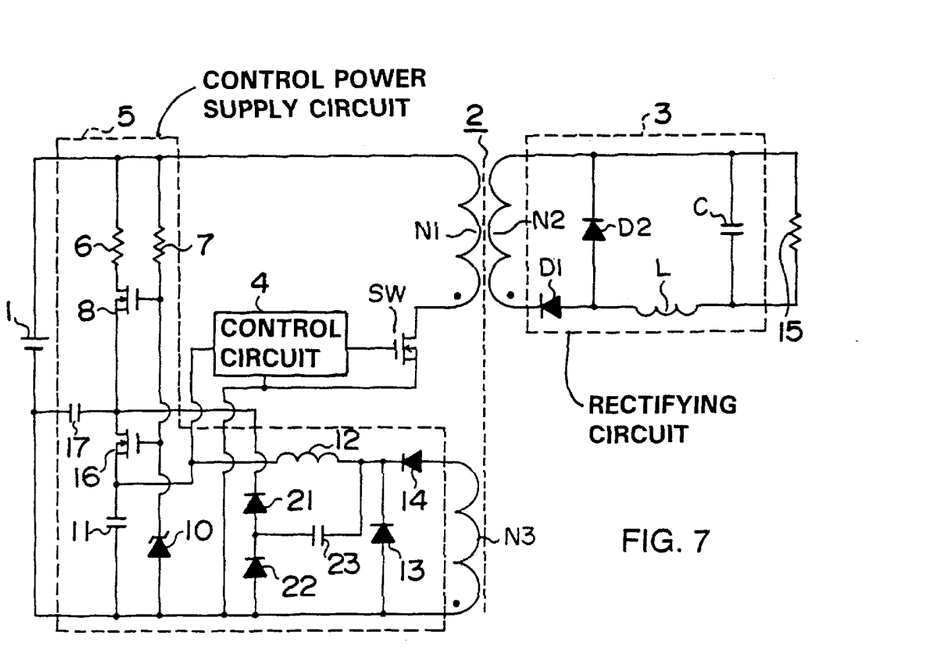
FIG. 7 is a circuit diagram showing a circuit shown in FIG. 1 in which the rectifying circuit shown in FIG. 2C is incorporated.
Figure 8:
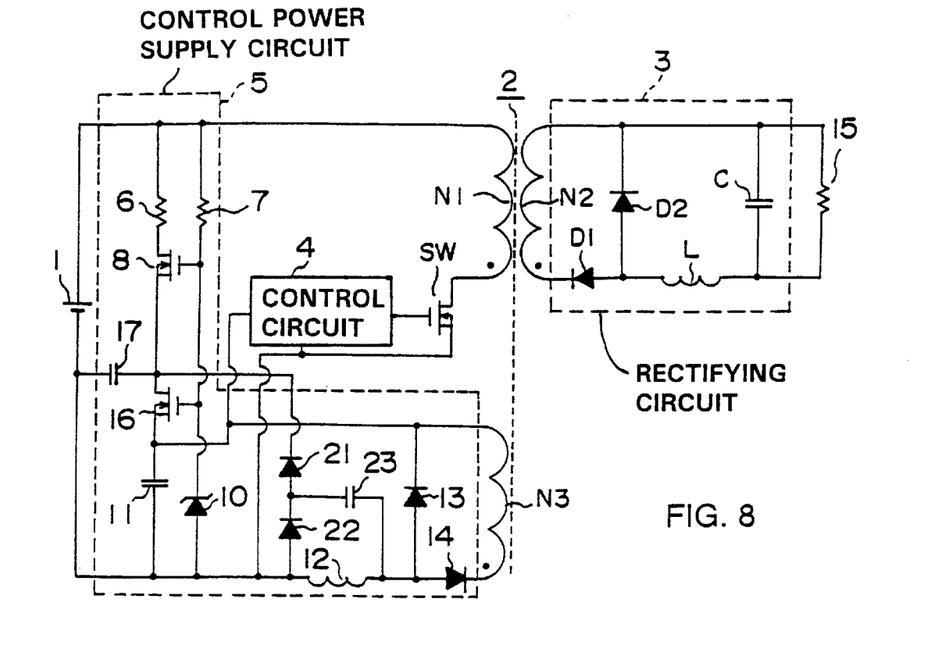
FIG. 8 is a circuit diagram showing a circuit shown in FIG. 1 in which the rectifying circuit shown in FIG. 2D is incorporated.

FIG. 4 shows an example of the source circuit in which the rectifying circuit 18 as shown in FIG. 2B is built in the control power supply circuit 5. FIG. 6 shows an example of the power source circuit in which the rectifying circuit 18 as shown in FIG. 2B is built in the control power supply circuit 5 in such a manner that power can be fed through an intermediate tap of the auxiliary coil N3. FIG. 7 shows an example of the electric power source circuit in which the rectifying circuit 18 as shown in FIG. 2C is built in the control power supply circuit 5. FIG. 8 shows an example of the electric power source circuit in which the rectifying circuit 18 as shown in FIG. 2D is built in the control power supply circuit 5.

In the example shown in FIG. 4, the rectifying circuit 18 comprises a diode 20, the anode of which is connected to a node between the auxiliary coil N3 and the anode of the diode 14. The cathode of the diode 20 is connected to a node between the drain of the transistor element 16 and the capacitor 17.

In the example shown in FIG. 6, the rectifying circuit 18 comprises a diode 20 as well as the rectifying circuit 18 shown in FIG. 4, excepting that the anode side of the diode 20 is connected to an intermediate tap provided for the auxiliary coil N3.

In the example shown in FIG. 7, the rectifying circuit 18 is configured to include the choke coil 12, the diodes 13, 14, 21, and 22, and a capacitor 23. Thus, in this configuration, the choke coil 12 and the diodes 13, 14 also act as elements of the main power supply circuit. The anode side of the diode 22 is connected to a node between the auxiliary coil N3 and the diode 13, while the cathode of the diode 22 is connected to the anode of the diode 21 and one side of the capacitor 23, respectively. The other side of the capacitor 23 is connected to nodes between the diodes 13, 14 and the choke coil 12. Further, the cathode of the diode 21 is connected to a node between the transistor element 16 and the capacitor 17.

In the example shown in FIG. 8, the rectifying circuit 18 is configured to include the choke coil 12, the diodes 13, 14, 21, and 22, and the capacitor 23. In this configuration, the choke coil 12 and the diodes 13, 14 also act as elements of the main power supply circuit. The anode of the diode 22 is connected to a node between the Zener diode 10 and the choke coil 12, while the cathode of the diode 22 is connected to a node between the diode 21 and one side of the capacitor 23. The other side of the capacitor 23 is connected to a node between the choke coil 12 and the diode 14. The cathode of the diode 21 is connected to a node between the transistor element 16 and the capacitor 17.

As understood in the above description, any of the circuits shown in FIGS. 2B, 2C, and 2D can be built into the rectifying circuit 18 shown in FIG. 1.

The configuration of the embodiment of the control power supply circuit has been described. Hereinafter, the circuit operation of the embodiment of the control power supply circuit 5 will be briefly explained with reference to the circuit shown in FIG. 4.

In the ordinary state where the switching action of the switch element SW is controlled by the control circuit 4 so that a substantial power having a substantially stable control voltage Vse is supplied from the main power supply circuit to the control circuit 4, both of the transistor elements 8, 16 are in the conduction off-state, so that power outputted from the auxiliary coil N3 is rectified and smoothed by the diodes 13, 14, the choke coil 12 and the power source capacitor 11, so that power having a voltage substantially equal to the control voltage Vse is stably supplied from the main power supply circuit to the control circuit 4.

Further, at start-up and during overvoltage protection operation when the output of power from the auxiliary coil N3 is prevented, the transistor elements 8, 16 in the power supply change-over circuit get into the conducting state, so that power from the input power source 1, passing the resistor 6, the transistor 8, and the transistor element 16, sequentially, stabilized at the control voltage Vse by the transistor elements 8, 16 acting as series regulator, is supplied to the control circuit 4.

Further, at a low load and during overcurrent protection operation, the pulse width t of a pulse signal applied to the gate of the switching element SW becomes narrow (the duty is reduced). In the case where the voltage outputted from the main power supply circuit for the control circuit markedly decreases, due to this, the transistor element 16 gets into the conducting state while the transistor element 8 in the power supply change-over circuit is kept in the conduction off-state. When a pulse signal is applied to the gate of the switch element SW, the power outputted from the auxiliary coil N3 flows through the diode 20, so that the peak current as shown by waveform F in FIG. 5 flows into the capacitor 17 to peak-charge it. The charge voltage of the capacitor 17 flows through the transistor 16, and the power stabilized at the control voltage Vse by the transistor element 16 as series regulator is supplied to the control circuit 4.

The waveforms of current or voltage shown in FIG. 5 are given when the overcurrent protection is operated. Waveform A in FIG. 5 shows the waveform of drain voltage of the switch element SW. Waveform B in FIG. 5 shows the waveform of gate voltage of the switch element SW. Waveform C in FIG. 5 shows the waveform of drain current between the source and the drain of the switch element SW. Wave form D in FIG. 5 shows the waveform of a current flowing in the choke coil L in the choke input rectifying circuit 3. Waveform E in FIG. 5 shows the waveform of a current flowing in the choke coil 12 in the control power supply circuit 5. Waveform F in FIG. 5 shows the waveform of a current flowing in the capacitor 17 in the auxiliary power supply circuit.

In the instant embodiment, in addition to the start-up circuit and the main power supply circuit, there are provided the auxiliary power supply circuit, in which, by using power outputted from the auxiliary coil N3, a power controlled at the control voltage Vse by the series regulator is supplied to the control circuit 4, and the power supply change-over circuit to make the main power supply circuit supply a power to the control circuit 4 in the normal condition, make the auxiliary power supply circuit supply power to the control circuit 4 at a low load and during overcurrent protection operation, and make the start-up circuit supply power to the control circuit 4 at start up and during overvoltage protection operation. Thus, the conduction loss in the circuit can be reduced, and the deterioration of the circuit efficiency can be prevented in any case, that is, in the normal condition, at a low load, at overcurrent protection, at start-up, and at overvoltage protection operation.

More particularly, it is for a very short time that power is supplied from the start-up circuit to the control circuit 4 at start-up and so forth. Accordingly, the conduction loss in the series regulator provided in the start-up circuit can be significantly inhibited, due to the short conduction time. In addition, the difference between voltages on the incoming, outgoing sides of the of the transistor element 16 as a series regulator provided in the auxiliary power supply circuit is by far lower than that between voltages on the incoming, outgoing sides of the transistor element 8. This allows the voltage loss in the auxiliary power circuit to decrease significantly as compared with that in the start-up circuit. Needless to say, since the conduction loss in the main electric power supply circuit is small, the deterioration of the circuit efficacy of the control electric power circuit 5 can be prevented.

In addition, since the conduction loss can be inhibited as described above, the maximum heat stresses on the respective elements of the circuit can be remarkably inhibited. This makes it unnecessary to use large size devices with high thermal durability as the elements, and realizes the miniaturization of the circuit.

Further, since the transistor elements 8 and 16 constituting the power supply change-over circuit act as the series regulators in the start-up circuit and in the auxiliary circuit, respectively, the number of parts as elements of the circuit can be reduced, and the simplification of the circuit can be promoted.

The present invention, not restricted to the above embodiments, can be embodied in other various forms. For example, in the above embodiment, a configuration is provided, in which the gate of the transistor element 8 is connected directly to the gate of the transistor element 16 whereby the gate voltage applied to the gate of the transistor element 8 is equal to that applied to the gate of the transistor element 16. However, any configuration may be employed, in which a resistor is interposed between the gate of the transistor element 8 and the gate of the transistor element 16 whereby a voltage applied to the gate of the transistor element 8 is higher than that applied to the gate voltage of the transistor element 16.

When a voltage applied to the gate of the transistor element 8 is equal to that applied to the gate of the transistor element 16, the voltage supplied from the start-up circuit to the control circuit 4 is subtly different from that supplied from the auxiliary power supply circuit to the control circuit 4. In contrast, when a voltage applied to the gate of the transistor element 8 is set to be higher than that applied to the gate of the transistor element 16, the voltage to be supplied from the start-up circuit to the control circuit 4 and the voltage to be supplied from the auxiliary power supply circuit to the control circuit 4 can be equalized.

When the gate of the transistor element 8 and the gate of the transistor element 16 are connected directly, as shown in the above embodiment, the difference between the voltage supplied from the start-up circuit to the control circuit 4 and that supplied from the auxiliary power supply circuit to the control circuit 4 is very small. Thus, it is needless to say that the circuit operation can be carried out without obstacles.

Further, in the above-described embodiment, the transistor elements 8, 17 comprise MOS-FET's. However, either or both of the transistor elements may comprise bipolar transistors. Still further, in order that voltages to be applied to the gates of the transistor elements 8, 16 are kept at constant levels, respectively, the Zener diode 10 is connected to both of the gates of the transistor elements 8, 16. However, a gate voltage stabilizing circuit which can apply a constant voltage to the respective gates of the transistor elements 8, 16, instead of the Zener diode 10, may be connected to both of the gates of the respective transistors 8, 16. Alternatively, such gate voltage stabilizing circuits as described above may be connected to the gates of the transistor elements 8, 16, discretely.

Further, in the above-described embodiment, the transistor element 8 in the start-up circuit and the transistor element 16 in the auxiliary power supply circuit also act as elements of the power supply change-over circuit. However, the above-described electric power supply change-over circuit may have a circuit configuration in which the power supply operation of the main power supply circuit, the auxiliary power supply circuit, and the start-up circuit are changed over from each other.

Further, in the above-described embodiment, it is exemplified that the control circuit power supply circuit is incorporated into the resonance reset forward converter. However, the control circuit power supply circuit of the present invention can be included into a power source circuit or into a circuit other than the above resonance reset forward converter if it operates to rectify and smooth an output voltage from a transformer using power from an input power source, by the switch on-off operation of a switch element and includes a control circuit for controlling the switch on-off operation of the switch element.

Further, in the above-described embodiment, the control circuit power supply circuit 5 is connected to the control circuit 4 which switching-controls the switching element SW by controlling the duty. However, the control circuit power supply circuit may be connected to a control circuit of a type to carry out the switching control of the switch element SW by frequency control.

While preferred embodiments of the invention have been disclosed, various modes of carrying out the principles disclosed herein are contemplated as being within the scope of the following claims. Therefore, it is understood that the scope of the invention is not to be limited except as otherwise set forth in the claims.

What is claimed is:

1. A control circuit power supply circuit adapted to be incorporated into a power source circuit, the power source circuit supply power from an input power source wherein power intermittently supplied to a transformer by an on-off switching operation of a switch element and an output of the transformer is rectified and smoothed to output an output voltage, the control circuit power supply circuit being operative to supply power having a predetermined control voltage to a control circuit for controlling the on-off switching operation of the switch element to stabilize the output voltage of the power source circuit, the control circuit power supply circuit comprising:

a start-up circuit including a series regulator having power from the input power source applied thereto, and for supplying a start-up voltage stabilized at the control voltage by the series regulator to the control circuit;

a main power supply circuit excluding a series regulator wherein power provided from an auxiliary coil of the transformer is rectified and smoothed, and further supplied to the control circuit as a main power supply voltage for the control circuit;

an auxiliary power supply circuit including a series regulator in which power provided from the auxiliary coil is rectified and smoothed, stabilized at the control voltage by the series regulator of the auxiliary power supply circuit, and supplied to the control circuit as an auxiliary power supply voltage for the control circuit; and a power supply change-over circuit which allows:

the main power supply circuit to supply the main power supply voltage to the control circuit when a voltage level of power supplied to the control circuit is stable at the control voltage, the auxiliary power supply circuit to supply the auxiliary power supply voltage to the control circuit when the main power supply voltage provided from the main power supply circuit to the control circuit becomes lower than a predetermined voltage below the control voltage, and the start-up circuit to supply the start-up voltage to the control circuit when power is not provided from the auxiliary coil.

2. The control circuit power supply circuit according to claim 1, wherein the power supply change-over circuit includes a series connection of a first transistor element with a second transistor element, whereby the first transistor element acts as the series regulator in the start-up circuit, and the second transistor element acts as the series regulator in the auxiliary power supply circuit; and further wherein when the main power supply voltage supplied from the main power supply circuit to the control circuit is stable at the control voltage, both of the first and second transistor elements in the power supply change-over circuit are in a conduction-off state, so that power is supplied directly from the main power supply circuit to the control circuit, without flowing through the first and second transistor elements; wherein when the main power supply voltage supplied from the main power supply circuit to the control circuit becomes lower than a predetermined voltage below the control voltage, the second transistor element goes into a conducting state while the first transistor element is kept in the conduction-off state, so that power having the control voltage after flowing through the second transistor element is supplied from the auxiliary power supply circuit as the auxiliary power supply voltage to the control circuit; and wherein when power is not provided from the auxiliary coil, both of the first and second transistor elements are in the conducting state, so that power having the control voltage after flowing through the first transistor element and the second transistor element from the input power source is supplied from the start-up circuit to the control circuit.

3. A power supply circuit comprising:

a transformer having a primary coil, a secondary coil and an auxiliary coil;

a rectifying circuit, connected to the secondary coil of the transformer, for providing an output voltage;

a switching element, connected to the primary coil of the transformer, for intermittently supplying power from an input power source to the primary coil;

a control circuit, connected to the switching element, for controlling on-off operation of the switching element so as to stabilize the output voltage of the rectifying circuit; and a control circuit power supply circuit, connected to the control circuit, for supplying a predetermined control voltage to the control circuit, the control circuit power supply circuit comprising: a start-up circuit including a series regulator and supplying to the control circuit a start-up voltage stabilized at the predetermined control voltage by the series regulator by using power from an input power source; a main power supply circuit excluding a series regulator for rectifying and smoothing power provided from the auxiliary coil of the transformer and for providing power to the control circuit as a main power supply voltage; an auxiliary power supply circuit including a series regulator, the auxiliary power supply circuit rectifying and smoothing power from the auxiliary coil and having a series regulator for regulating the power from the auxiliary coil at the predetermined control voltage and providing it to the control circuit as an auxiliary power supply voltage; and a power supply change-over circuit for allowing the main power supply circuit to supply the main power supply voltage to the control circuit when the main power supply voltage supplied to the control circuit is stable at the control voltage, for allowing the auxiliary power supply circuit to supply the auxiliary power supply voltage to the control circuit when the main power supply voltage from the main power supply circuit to the control circuit becomes lower than a predetermined voltage below the control voltage, and for allowing the start-up circuit to supply the start-up voltage to the control circuit when power is not provided from the auxiliary coil.

4. The power supply circuit according to claim 3, wherein the power change-over circuit includes a series connection of a first transistor element and a second transistor element, whereby the first transistor element acts as the series regulator in the start-up circuit, and the second transistor element acts as the series regulator in the auxiliary power supply circuit: and further wherein when the main power supply voltage provided from the main power supply circuit to the control circuit is stable at the control voltage, both of the first and second transistor elements in the power change-over circuit are in a conduction-off state, so that power is supplied directly from the main power supply circuit to the control circuit, without flowing through the first and second transistor elements; wherein when the main power supply voltage supplied from the main power supply circuit to the control circuit becomes lower than a predetermined voltage below the control voltage, the second transistor element goes into a conducting state while the first transistor element is kept in the conduction-off state, so that power having the control voltage after flowing through the second transistor element is supplied from the auxiliary power supply circuit as the auxiliary power supply voltage to the control circuit; and wherein when power is not provided from the auxiliary coil, both of the first and second transistor elements go into the conducting state, so that power having the control voltage after flowing through the first transistor element and the second transistor element from the input power source, is supplied from the start-up circuit to the control circuit.

\* \* \* \* \*